Patented Feb. 28, 1933

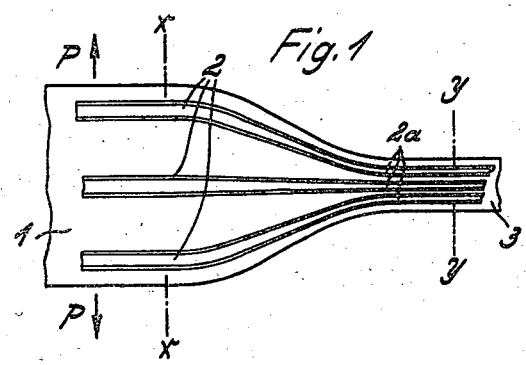
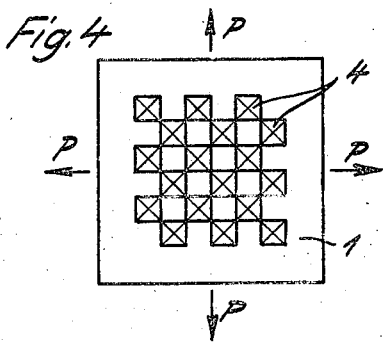
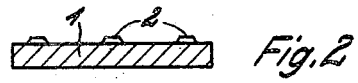
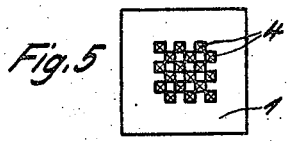
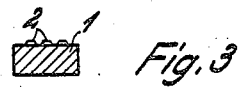
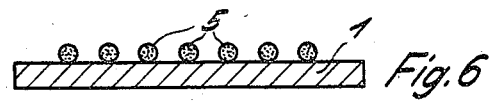
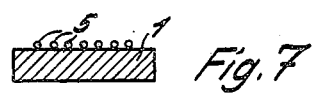
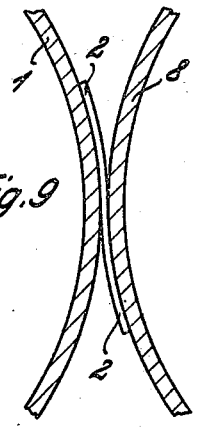

1,899,248

UNITED STATES PATENT OFFICE

VIKTOR VON GERDANOVITS, OF TEMESVAR, RUMANIA

METHOD OF PRODUCING PHOTOGRAPHIC SCREENS

Application filed November 14, 1929, Serial No. 407,265, and in Germany August 9, 1929.

This invention relates to a method of producing screens for photographical purposes, more particularly multi-color screens.

Methods of producing line and grain screens have already been proposed, in which the screen is produced either by print or by hand drawn lines. These methods are accompanied by the disadvantage that in view of the necessary small scale of the grain or lining the screen cannot be produced on economical lines. Beyond this, even when employing the finest means known in the printing trade, it is possible to produce only relatively coarse screens which are in no way adapted for cinematographic purposes.

The primary object of the present invention is accordingly to provide a screen which is particularly characterized by the even distribution of its elements, its exceptional thinness, and its great transparency.

According, therefore, to the invention, the material forming the screen is applied to a previously expanded elastic surface, such for example as rubber, in the form of print, hand drawn lines, threads, etc., in a size capable of allowing the application to be made in ready manner. The elastic surface, prior to the application, is expanded to a multiple of its original area, in the case of line screens transversely to the longitudinal direction of the lines, or in the case of grain screens in all directions.

In the case of color screens all colors may be applied simultaneously. On the elastic surface there is thus formed in the expanded state a coarse line or grain screen, and after the application the forces acting on the expanded surface are again caused to cease, so that the surface then assumes its original form. If a line of, say, .1 mm. has been printed on a surface previously expanded to, for example, six times its original width, and the surface subsequently again allowed to assume is original form, the thickness of the line is reduced to $$\frac{.1}{6},$$

or in other words .016 mm.

This grain, assuming the elastic material to be thin and transparent, may be applied with the elastic layer on the grain carrier, or alternatively transferred from the elastic surface to the carrier. The grain carrier is coated with a suitable adhesive, and the grain located on the elastic surface then pressed on to the carrier, so that the grain comes to rest between the carrier and the elastic surface. The elastic material is then stripped off leaving the grain on the carrier. Alternatively, the elastic material may be removed once the grain has been applied to the carrier by means of a solvent.

The material employed for the grain may be resin, resin substitutes, oil colors, varnishes, enamel, cellulose, nitro-cellulose, etc. The grain material may be applied in all colors simultaneously. Or it is possible to apply only one or two colors at the one time. Alternatively, operations may be so performed that only the lines in one color are applied to the carrier with corresponding spacing between the lines, subsequently a second series vertical to the direction of the first lines, so that the same adhere only to the carrier and do not cover the first lines, and the rectangular spaces remaining finally filled out with a third color.

In order to obtain a good colored picture it is necessary for the colour of the grain elements acting as filter to be a strong one. This strength of filter is not, from a psychological standpoint, essential for the eye in the color formation. A less vivid color on the other hand means a greater transparency. It would accordingly be of advantage to color the screen elements in such manner that merely a part of the colour consists of a vivid pigment, which in its vividness possesses only such concentration as suffices to form the psychological image. In addition the screen element is provided with a color addition which may be subsequently bleached by light or ultra-violet light, or removed from the screen by a chemical process. A screen is thus obtained which possesses the necessary strength of color when the exposure is made, but which, while offering an extremely good color reproduction, is extremely transparent when the color addition has been removed. In the case of color screen exposures it is important to eliminate the parallaxes which result both by reason of the thickness of the screen elements as well as owing to the fact that the grains of silver covering the screen elements are situated in the emulsion applied exteriorly of the screen elements. To avoid these parallaxes, which are of such importance in the projection and in the utilization of light when performing the exposures it is desirable to incorporate the grains of silver covering the grains of the screen in the screen elements themselves. According to the invention, the screen itself may consist of gelatine or other solutions made sensible to light, furnished with the corresponding colors. The screen elements are then produced from an emulsion colored in the basic colors.

The gelatine of the emulsion forming the screen may, in order to act as filter, be colored with a pigment which is insoluble in water. Or the emulsion employed as screen element may also contain other chemicals necessary for treatment of the picture.

The emulsion employed as screen element may be applied to the elastic surface in the form of filaments spread on the same through a nozzle. To facilitate color filter action on the outer face of the filament the latter may be furnished with a colored jacket accordingly acting as filter. This jacket may subsequently be partially removed, and may consist of a substance which does not offer any obstacle to the penetration of the developer. The coloring in this jacket may be subsequently removed by washing.

The invention is illustrated diagrammatically in the acompanying drawing.

Fig. 1 is a plan view of the elastic support with the screen thereon and expanded by forces.

Figs. 2 and 3 are sections along x—x and y—y respectively of Fig. 1.

Figs. 4 and 5 show a modification.
Figs. 6 and 7 show another modification.
Fig. 8 is a section through the filament used in Figs. 6 and 7.
Fig. 9 illustrates the step of transferring the screen to the final support.

With reference to Fig. 1, 1 is a piece of rubber, which is preferably a thin sheet, and which is expanded by forces acting in the direction of the arrows P. The line grain 2 is applied to the rubber thus tensioned, and after the application the rubber again allowed to assume its normal position, as indicated by the reference numeral 3. The lines of the grain then not only become thinner but also approach each other to a much greater degree, so that a screen 2a is formed.

Fig. 2 is a section aling the line x—x of Fig. 1, while Fig. 3 is a section along the line y—y of Fig. 1. By comparing Figs. 2 and 3 it will readily be appreciated that the line grain possesses a considerably greater degree of fineness.

Fig. 4 illustrates the production of a grain screen. The grain screen is also applied to a rubber layer 1 which is evenly expanded in all directions, the single grains being designated by the reference numeral 4. After the forces expanding the rubber have again been allowed to relax, the sheet of rubber, as shown in Fig. 5, again assumes its original form, possessing a much smaller area, whereby the spaces intermediate the grains are reduced in size, so that a grain screen of extreme fineness is formed.

Fig. 6 shows in diagrammatical form the production of a screen by the use of filaments 5, which are also applied to a sheet of rubber previously tensioned. When the sheet of rubber again assumes its original state a screen is formed as shown diagrammatically in Fig. 7.

Fig. 8 shows the section through a filament 6 formed from an emulsion and having a jacket 7, as described in the above.

In Fig. 9 1 is the sheet of rubber to which the grain 2 has been applied and which has again been allowed to assume its original condition. By rolling the grain 2 over the actual carrier 8 the same is transferred to the said carrier, the latter being furnished with a suitable adhesive so that the grain 2 will readily adhere thereto.

It will be understood that no restriction is made to the exact forms of embodiment described, and that various modifications are quite possible within the meaning of the above and the appended claims without departing from the spirit of the invention. Thus, for example, the process described is also adapted for use in the production of cliché screens employed for making prints.

What I claim as new and desire to secure by Letters Patent is:

1. A method of producing regular line, mosaic and like screens for photographic purposes, and more particularly multi-color screens, consisting in first applying to a temporary carrier of expanded elastic material, filter forming materials consisting of variously colored liquid substances in adjacent and separate disposal in continuously recurring sections, then causing said colored substances to assume a plastic condition, allowing said elastic material to contract to its original size thereby causing said plastic colored substances to contract together with the said carrier and then transferring the screen thus obtained from the said temporary carrier to the carrier proper, furnished with a suitable adhesive to cause the screen to adhere.

2. A method as described in claim 1 in which the liquid substance comprises a viscous liquid.

3. A method as described in claim 1 in which the liquid substance comprises a thin liquid.

4. A method as described in claim 1 in which the liquid substance comprises a thick liquid.

5. A method as described in claim 1 in which the liquid substance is selected from a group consisting of resin, oil colors, varnish, enamel, cellulose and nitrocellulose.

In testimony whereof I have affixed my signature.

VIKTOR von GERDANOVITS.